United States Patent
Chen

(10) Patent No.: US 9,914,047 B2
(45) Date of Patent: Mar. 13, 2018

(54) AIMING METHOD AND DEVICE FOR SHOOTING GAME

(71) Applicant: Wanjie (Shanghai) Network Co., Ltd., Shanghai (CN)

(72) Inventor: Rong Chen, Guangdong (CN)

(73) Assignee: Wanjie (Shanghai) Network Co., Ltd., Shanghai (CN)

( * ) Notice: Subject to any disclaimer, the term of this patent is extended or adjusted under 35 U.S.C. 154(b) by 68 days.

(21) Appl. No.: 14/903,605

(22) PCT Filed: Feb. 11, 2015

(86) PCT No.: PCT/CN2015/072789
§ 371 (c)(1),
(2) Date: Jan. 8, 2016

(87) PCT Pub. No.: WO2016/123816
PCT Pub. Date: Aug. 11, 2016

(65) Prior Publication Data
US 2016/0317913 A1    Nov. 3, 2016

(30) Foreign Application Priority Data

Feb. 2, 2015    (CN) .......................... 2015 1 0054312

(51) Int. Cl.
*G06F 17/00* (2006.01)
*A63F 13/211* (2014.01)
(Continued)

(52) U.S. Cl.
CPC ........ *A63F 13/211* (2014.09); *A63F 13/2145* (2014.09); *A63F 13/525* (2014.09); *A63F 13/5255* (2014.09); *A63F 13/837* (2014.09); *A63F 13/92* (2014.09); *G06F 3/0346* (2013.01); *G06F 3/0482* (2013.01); *G06F 3/0488* (2013.01); *A63F 2300/105* (2013.01); *A63F 2300/1075* (2013.01); *A63F 2300/204* (2013.01)

(58) Field of Classification Search
USPC ......................................................... 463/1–6
See application file for complete search history.

(56) References Cited

U.S. PATENT DOCUMENTS

| 6,379,249 B1 * | 4/2002 | Satsukawa | ............. A63F 13/04 273/148 B |
| 6,582,299 B1 * | 6/2003 | Matsuyama | ............. A63F 13/04 463/2 |

(Continued)

*Primary Examiner* — Ronald Laneau

(57) ABSTRACT

The present invention relates to an aiming method for a shooting game, which is applied to a mobile terminal having a touch display screen. The method comprises the following steps: a positioning step, acquiring a current rotation angle of a virtual camera when the mobile terminal is in a game interface; a rotation step, acquiring a coordinate position of a contact object when detecting that there is contact on the game interface, so that the current rotation angle of the virtual camera matches the coordinate position; and an adjusting step, acquiring a corresponding waggle angle via a sensor of the mobile terminal when detecting that the mobile terminal is waggling, so that the current rotation angle of the virtual camera matches the waggle angle. The present invention further relates to an aiming device for a shooting game.

10 Claims, 2 Drawing Sheets

(51) Int. Cl.
*A63F 13/2145* (2014.01)
*A63F 13/837* (2014.01)
*G06F 3/0346* (2013.01)
*G06F 3/0482* (2013.01)
*G06F 3/0488* (2013.01)
*A63F 13/92* (2014.01)
*A63F 13/525* (2014.01)
*A63F 13/5255* (2014.01)

(56) References Cited

U.S. PATENT DOCUMENTS

| | | | | |
|---|---|---|---|---|
| 7,607,111 B2 * | 10/2009 | Vaananen | ............ | G06F 1/1626 345/156 |
| 9,199,168 B2 * | 12/2015 | Ito | ........................ | A63F 13/211 |
| 2008/0119269 A1 * | 5/2008 | Nonaka | ................... | A63F 13/06 463/32 |
| 2010/0009760 A1 * | 1/2010 | Shimamura | ........... | A63F 13/211 463/43 |
| 2012/0106041 A1 * | 5/2012 | Ashida | .................... | A63F 13/06 361/679.01 |

* cited by examiner

AIMING METHOD AND DEVICE FOR SHOOTING GAME

TECHNICAL FIELD

The present invention relates to an aiming technique in a mobile game and, in particular, to an aiming method and device for a shooting game on a mobile touch-screen terminal.

BACKGROUND

The mobile game is an electronic game service that a user operates on a mobile touch-screen terminal, e.g., a platform such as a mobile phone, a tablet computer, via a mobile communication network, which comprises a chess and card game, a role-playing game, a strategy game, an action game, etc. At present, the shooting game, as one of the action games, typically uses the following solution to implement aiming and shooting by means of a virtual camera: a double-joystick operation solution that is used by both the mainstream FPS (e.g., the Modern Warfare series) and TPS (e.g., the Frontline Commando series) on a mobile touch-screen terminal at present. Such a solution is to simulate two joysticks on a touch screen, the left joystick controlling the movement of a target and the right joystick controlling a lens of the virtual camera to aim and shoot. This solution seems reasonable, but actually is not ergonomic:

firstly, the right joystick is used to replace mouse operation, meaning that a series of complex, fine and fast operations that can only be completed with the entire arm previously are required to be completed entirely by the right thumb, which will bring great difficulties to the player during steering and aiming and cause the result to be riddled with errors; and secondly, a virtual joystick cannot provide feedback to a hand of the player like a real joystick or a mouse, and thus the user needs to perform observation and calibration with his/her own eyes for any operation, which further increase the difficulty of the operation.

The above two points may increase user experience frustration during the game and decrease the overall perception, so that the FPS and the TPS on the mobile touch-screen apparatus has narrow audience and is difficult to develop, and thus is far from the market effect that should be obtained.

SUMMARY OF THE INVENTION

In view of the disadvantages in the prior art, an objective of the present invention is intended to provide an aiming method for a shooting game, which facilitates accurate steering and aiming of a virtual camera and can also effectively improve the game experience.

In order to achieve the above objective, the present invention adopts the following technical solution:

An aiming method for a shooting game, which is applied to a mobile terminal having a touch display screen, characterized in that the aiming method comprises the following steps:

a positioning step: acquiring a current rotation angle of a virtual camera when the mobile terminal is in a game interface;

a rotation step: acquiring a coordinate position of a contact object when detecting that there is contact on the game interface, so that the current rotation angle of the virtual camera matches the coordinate position; and an adjusting step: acquiring a corresponding waggle angle via a sensor of the mobile terminal when detecting that the mobile terminal is waggling, so that the current rotation angle of the virtual camera matches the waggle angle.

Preferably, the rotation step comprises the following sub-steps:

an object determination step: when detecting that there is contact on the game interface, detecting all list objects that are in a touch state, obtaining a list object that is in a game interface clicking state and denoting same as the contact object, and acquiring the coordinate position of the contact object;

an auxiliary step: creating, according to an auxiliary function, an auxiliary ray with a near clip plane of the virtual camera as a start point and passing through the coordinate position, and acquiring a rotation angle of the auxiliary ray;

an increment determination step: obtaining an intermediate interpolation between the current rotation angle of the virtual camera and the rotation angle of the auxiliary ray by means of a cyclical function;

an increment application step: applying the intermediate interpolation to the virtual camera, so that an amplitude of rotation of the virtual camera is equal to the intermediate interpolation, and recording a rotation angle of the virtual camera after a rotation; and a judgment step: if the rotation angle of the virtual camera after the rotation matches the rotation angle of the auxiliary ray, completing a preliminary movement of the virtual camera; otherwise, returning to the increment determination step.

Preferably, the sensor in the adjusting step is a gyroscope, wherein, by starting the gyroscope, a gravity parameter value of the gyroscope is acquired to control the rotation angle of the virtual camera.

Preferably, the sensor in the adjusting step is a gravity sensor, wherein, by starting the gravity sensor, an acceleration value of the gravity sensor is acquired in real time; and an angle variation of the acceleration value generated per second is judged, and if the angle variation exceeds a preset threshold, the rotation angle of the virtual camera is controlled according to the angle variation after the rotation.

Preferably, the acceleration value is a three-dimensional vector value which is constituted by an X-axis acceleration value, a Y-axis acceleration value and a Z-axis acceleration value, wherein the magnitudes of the X-axis acceleration value, the Y-axis acceleration value and the Z-axis acceleration value all range from −1 to 1.

The present invention further proposes an aiming device for a shooting game, which comprises the following modules:

a positioning module for acquiring a current rotation angle of a virtual camera when the mobile terminal is in a game interface;

a rotation module for acquiring a coordinate position of a contact object when detecting that there is contact on the game interface, so that the current rotation angle of the virtual camera matches the coordinate position; and an adjusting module for acquiring a corresponding waggle angle via a sensor of the mobile terminal when detecting that the mobile terminal is waggling, so that the current rotation angle of the virtual camera matches the waggle angle.

Preferably, the rotation module comprises the following sub-modules:

an object determination module for, when detecting that there is contact on the game interface, detecting all list objects that are in a touch state, obtaining a list object that is in a game interface clicking state and denoting same as the contact object, and acquiring the coordinate position of the contact object;

an auxiliary module for creating, according to an auxiliary function, an auxiliary ray with a near clip plane of the virtual camera as a start point and passing through the coordinate position, and acquiring a rotation angle of the auxiliary ray;

an increment determination module for obtaining an intermediate interpolation between the current rotation angle of the virtual camera and the rotation angle of the auxiliary ray by means of a cyclical function;

an increment application module for applying the intermediate interpolation to the virtual camera, so that an amplitude of rotation of the virtual camera is equal to the intermediate interpolation, and recording a rotation angle of the virtual camera after a rotation; and a judgment module for, if the rotation angle of the virtual camera after the rotation matches the rotation angle of the auxiliary ray, completing a preliminary movement of the virtual camera; otherwise, returning to the increment determination module.

Preferably, the sensor in the adjusting module is a gyroscope, wherein, by starting the gyroscope, a gravity parameter value of the gyroscope is acquired to control the rotation angle of the virtual camera.

Preferably, the sensor in the adjusting module is a gravity sensor, wherein, by starting the gravity sensor, an acceleration value of the gravity sensor is acquired in real time; and an angle variation of the acceleration value generated per second is judged, and if the angle variation exceeds a preset threshold, the rotation angle of the virtual camera is controlled according to the angle variation after the rotation.

Preferably, the acceleration value is a three-dimensional vector value which is constituted by an X-axis acceleration value, a Y-axis acceleration value and a Z-axis acceleration value, wherein the magnitudes of the X-axis acceleration value, the Y-axis acceleration value and the Z-axis acceleration value all range from −1 to 1.

The beneficial effects of the present invention are as follows: the method facilitates accurate steering and aiming of the virtual camera, and can also effectively improve the player's experience of the game; and the present solution employs a way of combining a touch-screen and a gravity sensor or a gyroscope, that is, a preliminary rotation of a virtual camera is collimated after a contact object is detected, and a rotation angle of the virtual camera is adjusted accurately via the gravity sensor or the gyroscope, thereby facilitating the accurate aiming of the virtual camera at the contact object, and further improving the player experience during the game.

DETAILED DESCRIPTION

The present invention will be further described below in conjunction with the drawings and the particular embodiments.

Figure 1:
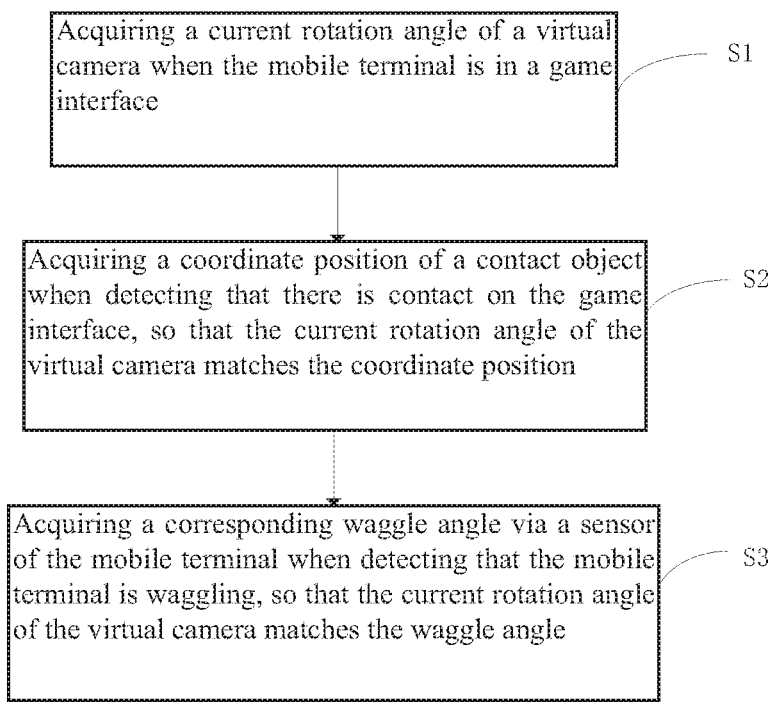
FIG. 1 is a flow chart of a preferred implementation of an aiming method for a shooting game of the present invention.

Please refer to FIG. 1, the present embodiment relates to an aiming method for a shooting game, which is applied to a mobile terminal having a touch display screen, the aiming method comprising the following steps:

A positioning step S1: acquiring a current rotation angle of a virtual camera when the mobile terminal is in a game interface. The virtual camera is an "eye" of a player in a 3D game and a scene photographed by the virtual camera is a scene that the player sees on the screen, there being only one unique virtual camera in one scene throughout the game. The current rotation angle of the virtual camera is a quaternion, wherein the quaternion can be seen as a four-dimensional vector for representing the rotation of an object in a space.

A rotation step S2: acquiring a coordinate position of a contact object when detecting that there is contact on the game interface, so that the current rotation angle of the virtual camera matches the coordinate position. In particular, this is a step of coarsely adjusting the position of a front sight during the game, that is, once detecting that there is contact in the game interface, the virtual camera rotates and aligns with a range where there is contact, so that the range where there is contact can be displayed on a preset position on the touch display screen of the mobile terminal, wherein the preset position can be the center of the screen. This step can be implemented by clicking the touch-screen, corresponding to the operation in which the player rapidly slides a mouse with his/her shoulder and elbow, steers and approximately aims at the target in a keyboard-mouse FPS, thereby completing the operation of a large rotation of the virtual camera, and at this time, the rotation angle is always greater than 10 degrees, and also, the rotation angle of the large rotation of the virtual camera is greater than how many degrees can certainly be set according to the actual conditions.

An adjusting step S3: acquiring a corresponding waggle angle via a sensor of the mobile terminal when detecting that the mobile terminal is waggling, so that the current rotation angle of the virtual camera matches the waggle angle. In particular, this is a step of finely adjusting the position of the front sight during the game, and when the contact range in the game is displayed at the preset position on the touch display screen of the mobile terminal, accurate aiming is achieved with a sensor. This step can be implemented by waggling the mobile terminal and via the sensor, corresponding to the operation in which the player gently moves the mouse with his/her wrist and aims at the head of the target in the keyboard-mouse FPS, thereby completing the operation of a slight rotation of the virtual camera, and at this time, the rotation angle is always smaller than 5 degrees, and also, the rotation angle of the slight rotation of the virtual camera is smaller than how many degrees can certainly be set according to the actual conditions.

Figure 2:
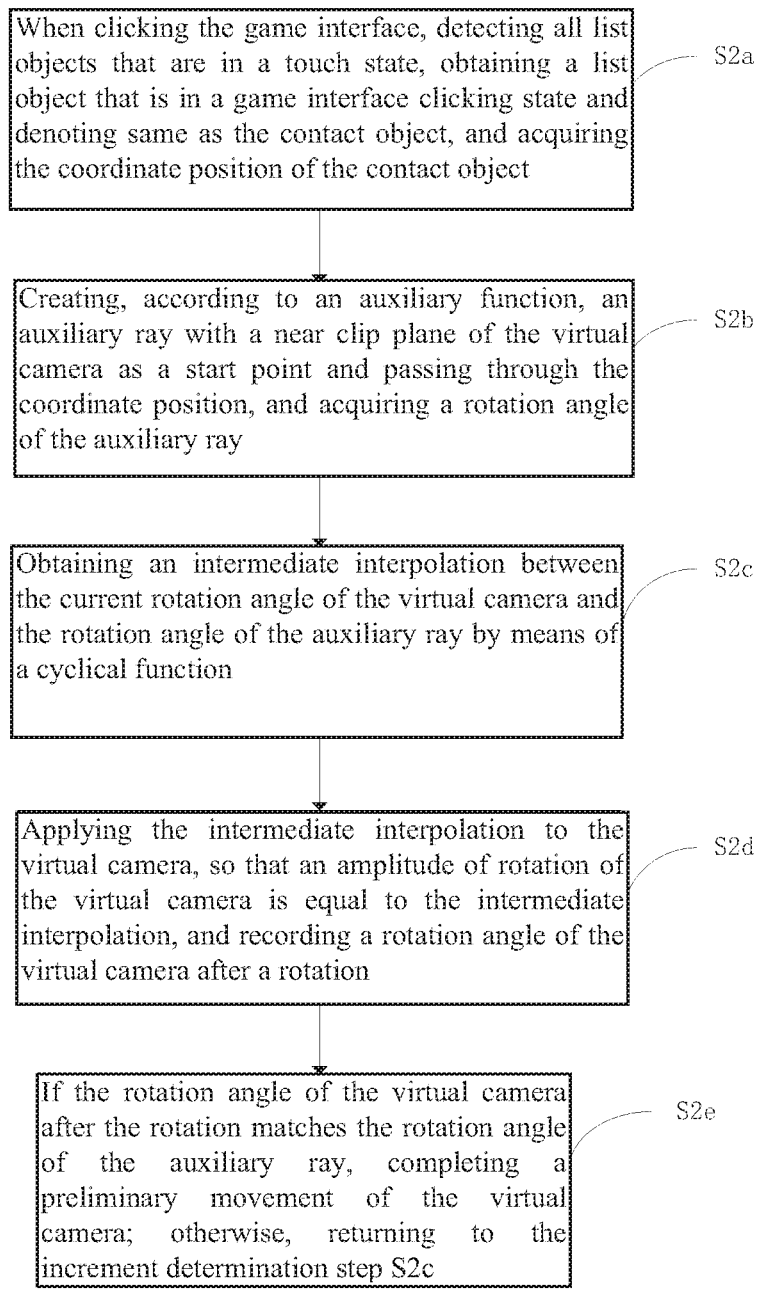
FIG. 2 is a flow chart of a preferred implementation of a rotation step in an aiming method for a shooting game of the present invention.

As shown in FIG. 2, the rotation step S2 may comprise the following sub-steps:

An object determination step S2a: when clicking the game interface, detecting all list objects that are in a touch state, obtaining a list object that is in a game interface clicking state and denoting same as the contact object, and acquiring the coordinate position, touchPosition, of the contact object.

An auxiliary step S2b: creating, according to an auxiliary function, an auxiliary ray, Ray, with a near clip plane of the virtual camera as a start point and passing through the coordinate position, touchPosition, and acquiring a rotation angle, touchQ, of the auxiliary ray, Ray. This auxiliary function can be a Unity function, ScreenPointToRay.

An increment determination step S2c: obtaining an intermediate interpolation, lerpQ, between the current rotation angle of the virtual camera and the rotation angle, touchQ, of the auxiliary ray by means of a cyclical function. This cyclical function can be any one of an Update, FixedUpdate, InvokeRepeating function and a coroutine while function. The intermediate interpolation, lerpQ, is a quaternion which continually gets closer to the direction of the auxiliary ray, because a quaternion is a four-dimensional vector that can be normalized and is suitable for various types of interpolations, such as a linear interpolation algorithm: q(t)=(1−t)q1+t q2/‖(1−t)q1+tq2‖. For more information, reference can be made to "Research and Application of Smooth Rotation on the Role in the Game Use of Quaternion Interpolation Algorithm" by Zheng Jun, YINSHAN ACADEMIC JOURNAL (NATURAL SCIENCE), no. 1, 2012.

An increment application step S2d: applying the intermediate interpolation, lerpQ, to the virtual camera, so that an amplitude of rotation of the virtual camera is equal to the intermediate interpolation, lerpQ, and recording a rotation angle of the virtual camera after a rotation.

A judgment step S2e: if the rotation angle of the virtual camera after the rotation matches the rotation angle of the auxiliary ray, completing a preliminary movement of the virtual camera, with the rotation angle of the virtual camera being consistent with the rotation angle of the auxiliary ray, Ray at this time; otherwise, returning to the increment determination step S2c.

Preferably, the sensor in the adjusting step can be a gyroscope, wherein, by starting the gyroscope, a gravity parameter value of the gyroscope is acquired to control the rotation angle of the virtual camera.

In particular, the values of a gravity parameter on the X-axis and the Y-axis are acquired after the gyroscope is started, and the values on the X-axis and the Y-axis are multiplied by a certain amplification factor coefficient, that is, the acquired values on the X-axis and the Y-axis are used as a basic value, the amplification factor coefficient of this basic value is pre-defined; a setting is customized that, the greater the amplification factor coefficient is, the greater the amplitude of rotation of the virtual camera is; and the amplified values on the X-axis and the Y-axis are used as an Euler angle of the quaternion and applied to the virtual camera. The gyroscope determines that a numerical value of the spatial attitude of the object is varying continuously along with the rotation of the object, and the values of the gravity parameter on the X-axis and the Y-axis continually obtained are multiplied by the customized amplification factor so as to obtain a final rotation angle of the virtual camera required to be obtained.

Certainly, the sensor in the adjusting step may be a gravity sensor and may also be other sensors that are able to acquire the corresponding waggle angle. In the adjusting step, by starting the gravity sensor, an acceleration value of the gravity sensor is acquired in real time; and an angle variation of the acceleration value generated per second is judged, if the angle variation exceeds a preset threshold, the rotation angle of the virtual camera is controlled according to the angle variation after the rotation. Furthermore, the acceleration value is a three-dimensional vector value which is constituted by an X-axis acceleration value, a Y-axis acceleration value and a Z-axis acceleration value, wherein the magnitudes of the X-axis acceleration value, the Y-axis acceleration value and the Z-axis acceleration value all range from −1 to 1.

In particular, the acceleration value of the gravity sensor in the mobile terminal can be acquired in real time according to Input.acceleration, this acceleration value being a three-dimensional vector, wherein the magnitude of the numerical value on the X-axis ranges from −1 to 1, the magnitude of the numerical value on the Y-axis ranges from −1 to 1, and the magnitude of the numerical value on the Z-axis ranges from −1 to 1. The particular principle thereof is as follows: put a mobile phone flat with the front face facing up, and according to the right hand rule, put the right hand out with the palm facing up, close together four fingers so that they get perpendicular to the thumb, wherein a direction indicated by the thumb is the X-axis on which the value is a three-dimensional vector (0, 0, 0), a direction indicated by the four fingers is the Y-axis on which the value is a three-dimensional vector (0, 0, 0) and a direction which is perpendicular to the palm and goes upwards is the Z-axis on which the value is a three-dimensional vector (0, 0, −1); and when the mobile terminal is rotated, assuming that there is a vector which is vertical downwards, then the values on the X-axis, the Y-axis and the Z-axis are respectively compared to this vector, when the directions are consistent, we get 1, when the directions are opposite, we get −1, and when the directions are perpendicular, 0.

The changed numerical values on the X-axis and the Y-axis are multiplied by a pre-defined coefficient and then applied to the values on the X-axis and the Y-axis of the Euler angle in the quaternion, so as to obtain a quaternion and it is assumed that the name is defined as accQ. That is, a three-dimensional vector is continuously obtained according to different spatial attitudes of the mobile terminal, and this three-dimensional vector also changes continuously when the mobile terminal is rotated, e.g., the value on the X-axis changes 0.1, the value on the Y-axis changes 0.2, then a three-dimensional vector (0.1, 0.2, 0) is used for representation. The pre-defined coefficient is how many degrees the rotation changes during a unit time, i.e. degrees/second, for example, it can be pre-defined that the rotation changes 5 degrees each time the value on the X-axis changes 0.1, that is, the greater the pre-defined coefficient is, the greater the amplitude of rotation of the virtual camera is when the pre-defined coefficient is applied to the virtual camera.

An included angle between a real-time quaternion accQ and a previous quaternion accQ thereof is calculated, and the real-time quaternion accQ is applied only when the included angle is greater than a preset threshold. In particular, when judging whether the included angle is greater than the preset threshold, a rotation angle lastQ can be obtained according to the real-time quaternion accQ and the previous quaternion accQ thereof, 1 degree being approximately 0.0174533 radians according to angle and radian conversion, and the radian of lastQ is compared to 0.0174533, if lastQ is greater than 0.0174533, then lastQ is considered to be greater than the preset threshold.

The Euler angle of the quaternion accQ is applied to the camera, and the camera is rotationally moved along with the spatial attitude of the mobile terminal, so as to complete the process of accurately aiming at the contact object. In particular, a quaternion is a four-dimensional vector (x, y, z, w). An operation such as rotation of a spatial object is implemented with a 4×4 matrix, and we cannot simply take a rotation angle to a vector. An Euler angle is a three-dimensional vector (x, y, z) representing rotation angles on the X-axis, the Y-axis and the Z-axis, and if the rotation angles on the X-axis and the Y-axis are taken, transformation from a quaternion to an Euler angle can be implemented, e.g. encapsulated as Quaternion.eulerAngles in a unity.

The present embodiment further proposes an aiming device for a shooting game, which comprises the following modules:

a positioning module for acquiring a current rotation angle of a virtual camera when the mobile terminal is in a game interface;

a rotation module for acquiring a coordinate position of a contact object when detecting that there is contact on the game interface, so that the current rotation angle of the virtual camera matches the coordinate position; and an adjusting module for acquiring a corresponding waggle angle via a sensor of the mobile terminal when detecting that the mobile terminal is waggling, so that the current rotation angle of the virtual camera matches the waggle angle.

Preferably, the rotation module comprises the following sub-modules:

an object determination module for, when clicking the game interface, detecting all list objects that are in a touch state, obtaining a list object that is in a game interface clicking state and denoting same as the contact object, and acquiring the coordinate position of the contact object;

an auxiliary module for creating, according to an auxiliary function, an auxiliary ray with a near clip plane of the virtual camera as a start point and passing through the coordinate position, and acquiring a rotation angle of the auxiliary ray;

an increment determination module for obtaining an intermediate interpolation between the current rotation angle of the virtual camera and the rotation angle of the auxiliary ray by means of a cyclical function;

an increment application module for applying the intermediate interpolation to the virtual camera, so that an amplitude of rotation of the virtual camera is equal to the intermediate interpolation, and recording a rotation angle of the virtual camera after a rotation; and a judgment module for, if the rotation angle of the virtual camera after the rotation matches the rotation angle of the auxiliary ray, completing a preliminary movement of the virtual camera; otherwise, returning to the increment determination module.

Preferably, the sensor in the adjusting module is a gyroscope, wherein, by starting the gyroscope, a gravity parameter value of the gyroscope is obtained to control the rotation angle of the virtual camera.

Preferably, the sensor in the adjusting module is a gravity sensor, wherein, by starting the gravity sensor, an acceleration value of the gravity sensor is acquired in real time; and an angle variation of the acceleration value generated per second is judged, and if the angle variation exceeds a preset threshold, the rotation angle of the virtual camera is controlled according to the angle variation after the rotation.

Preferably, the acceleration value is a three-dimensional vector value which is constituted by an X-axis acceleration value, a Y-axis acceleration value and a Z-axis acceleration value, wherein the magnitudes of the X-axis acceleration value, the Y-axis acceleration value and the Z-axis acceleration value all range from −1 to 1.

For a person skilled in the art, various other corresponding changes and modifications can be made according to the technical solutions and concepts described above, and all of these changes and modifications should fall within the scope of the claims of the present invention.

What is claimed is:

1. A method for aiming of a virtual camera on a graphical user interface (GUI) of a shooting game which is applied to a mobile terminal having a processor, a touch display screen and a sensor, the method comprising:

a positioning step: acquiring, by the processor, a current rotation angle of the virtual camera when the mobile terminal is in the GUI;

a coarse adjusting step: acquiring, by the processor, a coordinate position of a contact object in the touch display screen when detecting that there is contact on the GUI, and adjusting, by the processor, the current rotation angle of the virtual camera to match the coordinate position; and a fine adjusting step: acquiring, by the sensor, a corresponding waggle angle when detecting that the mobile terminal is waggling, and adjusting, by the processor, the current rotation angle of the virtual camera to match the waggle angle.

2. The method claim 1, wherein the coarse adjusting step comprises:

an object determination step: when detecting that there is contact on the GUI, detecting all list objects that are in a touch state, obtaining a list object that is in a GUI clicking state and denoting same as the contact object, and acquiring the coordinate position of the contact object;

an auxiliary step: creating, according to an auxiliary function, an auxiliary ray with a near clip plane of the virtual camera as a start point and passing through the coordinate position, and acquiring a rotation angle of the auxiliary ray;

an increment determination step: obtaining an intermediate interpolation between the current rotation angle of the virtual camera and the rotation angle of the auxiliary ray by means of a cyclical function;

an increment application step: applying the intermediate interpolation to the virtual camera, so that an amplitude of rotation of the virtual camera is equal to the intermediate interpolation, and recording a rotation angle of the virtual camera after a rotation; and a judgement step: if the rotation angle of the virtual camera after the rotation matches the rotation angle of the auxiliary ray, completing a preliminary movement of the virtual camera; otherwise, returning to the increment determination step.

3. The method of claim 1, wherein the sensor is a gyroscope, wherein, by starting the gyroscope, a gravity parameter value of the gyroscope is acquired to control the rotation angle of the virtual camera.

4. The method of claim 1, wherein the sensor is a gravity sensor, wherein, by starting the gravity sensor, an acceleration value of the gravity sensor is acquired in real time; and an angle variation of the acceleration value generated per second is judged, and if the angle variation exceeds a preset threshold, the rotation angle of the virtual camera is controlled according to the angle variation after the rotation.

5. The method of claim 4, wherein the acceleration value is a three-dimensional vector value which is constituted by an X-axis acceleration value, a Y-axis acceleration value and a Z-axis acceleration value, wherein the magnitudes of the X-axis acceleration value, the Y-axis acceleration value and the Z-axis acceleration value all range from −1 to 1.

6. A mobile terminal for aiming of a virtual camera on a graphical user interface (GUI) of a shooting game applied thereto, the mobile terminal having a processor, a touch display screen and a sensor, wherein the processor is configured to acquire a current rotation angle of the virtual camera when the mobile terminal is in the GUI; acquire a coordinate position of a contact object in the touch display screen when detecting that there is contact on the GUI, and adjust the current rotation angle of the virtual camera to match the coordinate position; and adjust the current rotation angle of the virtual camera to match a corresponding waggle angle, the waggle angle being acquired by the sensor when detecting that the mobile terminal is waggling.

7. The mobile terminal of claim 6, wherein when acquiring the coordinate position of the contact object and adjusting the current rotation angle of the virtual camera to match the coordinate position, the processor is configured to
- when detecting that there is contact on the GUI, detect all list objects that are in a touch state, obtain a list object that is in a GUI clicking state and denote same as the contact object, and acquire the coordinate position of the contact object;
- create, according to an auxiliary function, an auxiliary ray with a near clip plane of the virtual camera as a start point and passing through the coordinate position, and acquire a rotation angle of the auxiliary ray;
- obtain an intermediate interpolation between the current rotation angle of the virtual camera and the rotation angle of the auxiliary ray by means of a cyclical function;
- apply the intermediate interpolation to the virtual camera, so that an amplitude of rotation of the virtual camera is equal to the intermediate interpolation, and record a rotation angle of the virtual camera after a rotation; and
- if the rotation angle of the virtual camera after the rotation matches the rotation angle of the auxiliary ray, complete a preliminary movement of the virtual camera; otherwise, return to apply the intermediate interpolation to the virtual camera.

8. The mobile terminal of claim 6, wherein the sensor is a gyroscope, wherein, by starting the gyroscope, a gravity parameter value of the gyroscope is acquired to control the rotation angle of the virtual camera.

9. The mobile terminal of claim 6, wherein the sensor is a gravity sensor, wherein, by starting the gravity sensor, an acceleration value of the gravity sensor is acquired in real time; and an angle variation of the acceleration value generated per second is judged, and if the angle variation exceeds a preset threshold, the rotation angle of the virtual camera is controlled according to the angle variation after the rotation.

10. The mobile terminal of claim 9, wherein the acceleration value is a three-dimensional vector value which is constituted by an X-axis acceleration value, a Y-axis acceleration value and a Z-axis acceleration value, wherein the magnitudes of the X-axis acceleration value, the Y-axis acceleration value and the Z-axis acceleration value all range from −1 to 1.

* * * * *